United States Patent [19]

Tse

[11] Patent Number: 5,477,345
[45] Date of Patent: Dec. 19, 1995

[54] APPARATUS FOR SUBSAMPLING CHROMINANCE

[75] Inventor: Francis K. Tse, Rochester, N.Y.

[73] Assignee: Xerox Corporation, Stamford, Conn.

[21] Appl. No.: 167,314

[22] Filed: Dec. 15, 1993

[51] Int. Cl.$^6$ ............................... H04N 1/46; H04N 1/04
[52] U.S. Cl. .......................... 358/500; 358/513; 358/514; 358/482; 358/483; 348/272; 348/280; 348/281
[58] Field of Search ...................... 358/500, 501, 358/513, 514, 515, 520, 482, 483; 348/272, 273, 275, 277, 280, 281

[56] References Cited

U.S. PATENT DOCUMENTS

| | | | |
|---|---|---|---|
| 4,481,530 | 11/1984 | Wagensonner et al. | 358/483 |
| 4,605,956 | 8/1986 | Cok | 358/44 |
| 4,633,300 | 12/1986 | Sakai | 358/41 |
| 4,652,908 | 3/1987 | Fling et al. | 358/37 |
| 4,656,515 | 4/1987 | Christopher | 358/183 |
| 4,969,204 | 11/1990 | Melnychuck et al. | 382/56 |
| 5,018,006 | 5/1991 | Hashimoto | 348/275 |
| 5,055,921 | 10/1991 | Usui | 358/500 |
| 5,067,010 | 11/1991 | Ishii et al. | 358/13 |
| 5,077,810 | 12/1991 | D'Luna | 382/41 |
| 5,119,181 | 6/1992 | Perregaux et al. | 358/44 |
| 5,200,817 | 4/1993 | Birnbaum | 358/518 |
| 5,315,413 | 5/1994 | Yamamoto et al. | 358/514 |

Primary Examiner—Edward L. Coles, Sr.
Assistant Examiner—Thomas D. Lee
Attorney, Agent, or Firm—Don L. Webber

[57] ABSTRACT

The present invention relates to subsampling processors and a three color sensor array that may be employed to supply subsampled chrominance data to a printing machine, a computer memory device or other device. In one embodiment of the present invention, a three color array of the present invention scans features of an object using an array of one or more subsampling sensor sets spanning a fast scan direction width of n times m (preferably 2) pixels, with each set having aligned in a slow scan direction column m pixel-sized green sensors aligned in a fast scan direction line for determining pixel-by-pixel green color and luminance, a red sensor extending m pixels wide in said fast scan direction and m pixels long in said slow scan direction for detecting red color and a blue sensor extending m pixels wide in said fast scan direction and m pixels long in said slow scan direction for detecting blue color. Depending on the sensor array employed, the processor employs subsampling techniques and/or subsampled chrominance data to transform the outputs into X, Y and Z tristimulus values and thereafter to L*, a* and b* values corresponding to features of the object scanned.

5 Claims, 9 Drawing Sheets

Plot of 8-bit L* Values vs. Y

APPARATUS FOR SUBSAMPLING CHROMINANCE

The present invention is directed to an apparatus for subsampling chroma data in scanned images. More particularly, the present invention is directed to a chrominance subsampling processor and sensor array for use in scanning features of a sheet or object for printing, processing, storage and/or transmission.

Chroma sensing and sampling involves the detection of areas (often referred to as pixels) of color using CCD full width or other arrays of sensors. The color data from scanning arrays of sensors is generally collected by overlaying photosensitive sensors with filters so as to detect red, green and blue (RGB) intensity. Subsequently, color conversion is performed such that the RGB values of a color are converted to the corresponding CIE tristimulus values x, y and z. Thereafter, these tristimulus values are transformed to the L*a*b* color space. The resultant hue, chroma and lightness values can thereafter be transformed back to RGB values or the CMYK values for color output to a printer, to memory or to another device.

With the new developments in semiconductor and digital signal processing techniques, chroma subsampling is now being employed in cameras and video camcorders. Progress has been made in overcoming a number of difficulties encountered with certain subsampling implementations, such as in U.S. Pat. No. 4,605,956 to Cok, which teaches a digital signal processing technique was used to correct for color fringing effect of sharp edges due to chroma subsampling. While chroma subsampling has been employed in tile NTSC television broadcast standard, color subsampling is generally not used by most analog color TV cameras and monitors. The complexity of converting back and forth between subsampled and non-subsampled signals for gamma and color correction between cameras and monitors in the analog domain are highly complex and can require expensive hardware and software to implement.

It is desirable in may applications to employ chroma subsampling schemes in scanners in digital copiers or other devices used to reproduce, store or process color documents. Chroma subsampling may therefore be usefully employed in a number of color scanning situations due to a number of factors. One such factor stems from the reduced spatial sensitivity of the cone sensors of the human eye (as opposed to the rods which sense black and white components). Rather than requiring additional processors to perform color correction on scanned data, a subsampling sensor array can therefore be employed in document scanners as taught by the present invention to eliminate aspects of otherwise necessary hardware and software, while providing desirable subsampled/corrected color data output. In color document scanning applications as well as other situations, the amount or quantity of data that must be processed, stored and transmitted is of major concern in determining the feasibility and cost of subsampling chrominance. The hardware and software requirements for handling this task using previous subsampling methods and apparatuses can be prohibitive.

In the past a variety of arrangements have been used to sample chrominance data and otherwise employ color sensing and scanning, to include those taught by the following disclosures that may be relevant:

U.S. Pat. No. 5,119,181

Issued: Jun. 2, 1992

Patentee: Peregaux et al.

U.S. Pat. No. 5,077,810

Issued: Dec. 31, 1991

Patentee: D'Luna

U.S. Pat. No. 5,067,010

Issued: Nov. 19, 1991

Patentee: Ishii et al.

U.S. Pat. No. 4,969,204

Issued Nov. 6, 1990

Patentee: Melnychuck et al

U.S. Pat. No. 4,656,515

Issued Apr. 7, 1987

Patentee: Christopher

U.S. Pat. No. 4,652,908

Issued: Mar. 24, 1987

Patentee: Fling et al.

U.S. Pat. No. 4,633,300

Issued: Dec. 30, 1986

Patentee: Sakai

U.S. Pat. No. 4,605,956

Issued: Aug. 12, 1986

Patentee: Cok

U.S. Pat. No. 5,119,181 to Peregaux et al. discloses a color chip construction adapted for use in fabricating full width arrays in which the individual chip photosites consisting of a blue, green and red photodiode shaped and positioned to provide a rectangular photosite with square sides that enhance butting of the color chip with other like color chips to form full width color arrays.

U.S. Pat. No. 5,077,810 to D'Luna discloses a digital processing architecture for a high resolution image sensor uses a plurality of like digital processors for time-divided processing of the output of the sensor. Each processor is operational according to start and stop signals from a programmable sequencer. In a preferred embodiment, two sets of processors handle a line resolution of 1024 pixels, one set doing the first half of each line and the other set doing the second half. This is of particular utility where vertical processing is required, and the full line delays needed are divided into partial resettable delays resident in each of the processors.

U.S. Pat. No. 5,067,010 to Ishii et al. discloses a color video signal processing device in which pixels are thinned out for a whole picture plane with respect to each of two kinds of digital color difference signals in accordance with a predetermined role. The encoding is executed on a unit basis of a block consisting of (n×m) samples where (n and m are integers no less than 2) which are formed with respect to each of the two kinds of color difference signals whose pixels have been thinned out or a block consisting of (n×m) samples formed so as to include both of the two kinds of color difference signals whose pixels had been thinned out. The data compression is executed on a block unit basis.

U.S. Pat. No. 4,969,204 to Melnychuck et al. discloses an image processing method for hierarchical storage and display of high resolution digital images. Reduced resolution versions of the image are available for quick display on a monitor, while the high resolution image may be be accessed as a photographic quality hard copy. A hybrid coding scheme based on residuals is used to store the data.

U.S. Pat. No. 4,656,515 to Christopher discloses a television display including circuitry for reducing the amount of memory needed to hold one field of the reduced size image. In the display apparatus, digital samples representing the large and small picture signals are developed at substantially equal rates by separate circuitry. (This requirement for additional/separate subsampling processing capability is also common to other known subsampling applications such as color correction.) Subsampling circuitry stores One out of every five of the samples representing a horizontal line Of the small picture. These samples are displayed, synchronous with the large picture at a rate three-fifths times the display rate of the large picture samples to produce an apparent size reduction of one-third in the horizontal direction.

U.S. Pat. No. 4,652,908 to Fling et al. discloses a display including a filtering system for processing the video signals which produce the reduced-sized image. The filtering system includes an anti-aliasing filter which reduces the amplitude of the components of the video signals which may cause aliasing distortion when the image is subsampled. However, the filter passes substantial amounts of these components. The filtered video signal is subsampled and applied to a peaking filter which amplifies the band of frequencies containing the aliasing components relative to lower frequency bands to improve thee appearance of detailed portions of the reproduced image.

U.S. Pat. No. 4,633,300 to Sakai discloses a color information detecting device is constructed of detectors each for detecting a one of a number of different colors and each having a number of light receiving faces. The detectors are arranged on the same plane independently of each other. The light receiving faces of each detector are electrically connected and have their center of sensitivity distribution located at about the same point as that of the faces of another detector.

U.S. Pat. No. 4,605,956 to Cok discloses an electronic color camera having a single-chip solid state color image sensor, includes a color dependent birefringent spatial filter that deflects red and blue light from portions of an image sampled by the neighboring green sensitive image sensing elements onto red and blue sensitive image sensing elements. Signal processing electronics produces interpolated red and blue signal values by forming red and blue hue component values at the red and blue sampling locations, interpolating the hue component values, and producing the interpolated red and blue values, and green signal values at the interpolation locations. As a result, color fringes at monochrome edges are completely eliminated, and are substantially reduced at colored edges.

In accordance with one aspect of the present invention, there is provided an apparatus for sensing and subsampling luminance and chrominance of features on an object being scanned in a fast scan direction and a slow scan direction. The apparatus includes an array of n subsampling sensor sets spanning a fast scan direction width of n times m pixels, each of the sensor sets including, aligned in a slow scan direction column, a set of m pixel-sized green sensors aligned in a fast scan direction line for determining pixel-by-pixel green color and luminance, a red sensor extending m pixels wide in the fast scan direction and m pixels long in the slow scan direction for detecting red color and a blue sensor extending m pixels wide in the fast scan direction and m pixels long in the slow scan direction for detecting blue color. The apparatus also includes a main processor for determining a high resolution luminance according to a luminance output of the green sensors whereby the luminance outputs are transformed into Y tristimulus values and thereafter to high resolution $L^*$ values corresponding to the features of the object and a low resolution subsampled chrominance output according to the red and blue sensor color determinations, whereby the luminance and chrominance outputs are transformed into X, Y and Z tristimulus values and thereafter to color corrected $L^*$, $a^*$ and $b^*$ values corresponding to the features of the object.

In accordance with another aspect of the present invention, there is provided an apparatus for sensing and subsampling luminance and chrominance of features on an object being scanned in a fast scan direction and a slow scan direction by an array having green, red and blue sensors. The apparatus includes a main processor for determining a high resolution luminance according to a luminance output of the green sensors and a low resolution subsampled chrominance output according to a summed green sensor output of n green sensors, a summed red sensor output of n red sensors and a summed blue sensor output of n blue sensors, whereby the luminance and chrominance outputs are transformed by the main processor into X, Y and Z tristimulus values and thereafter to $L^*$, $a^*$ and $b^*$ values corresponding to the features of the object.

In accordance with another aspect of the present invention, there is provided an electrophotographic printing machine having an apparatus for sensing and subsampling luminance and chrominance of a sheet having multicolored indicia thereon, and means responsive to $L^*$, $a^*$ and $b^*$ values for reproducing a copy of the sheet being scanned in a fast scan direction and a slow scan direction. The apparatus includes an array of n subsampling sensor sets spanning a fast scan direction width of n times m pixels, each of the sensor sets including, aligned in a slow scan direction column, a set of m pixel-sized green sensors aligned in a fast scan direction line for determining pixel-by-pixel green color and luminance, a red sensor extending m pixels wide in the fast scan direction and m pixels long in the slow scan direction for detecting red color and a blue sensor extending m pixels wide in the fast scan direction and m pixels long in the slow scan direction for detecting blue color. The apparatus also includes a main processor for determining a high resolution luminance according to a luminance output of the green sensors whereby the luminance outputs are transformed into Y tristimulus values and thereafter to high resolution $L^*$ values corresponding to the multicolored indicia on the sheet and a low resolution subsampled chrominance output according to the red sensor and the blue sensor color determinations, whereby the luminance and chrominance outputs are transformed into X, Y and Z tristimulus values and thereafter to color corrected L* a* and b* values corresponding to the multicolored indicia on the sheet.

Further aspects and advantages of the present invention will become apparent from the following description of the various embodiments and characteristic features of the present invention.

The following is a brief description of each drawing used to describe the present invention, and thus, are being presented for illustrative purposes only and should not be limited of the scope of the present invention, wherein.

While the present invention will hereinafter be described in connection with preferred embodiments thereof, it will be understood that it is not intended to limit the invention to these embodiments. On the contrary, it is intended to cover all alternatives, modifications and equivalents, as may be included within the spirit and scope of the invention as defined by the appended claims.

Figure 10:
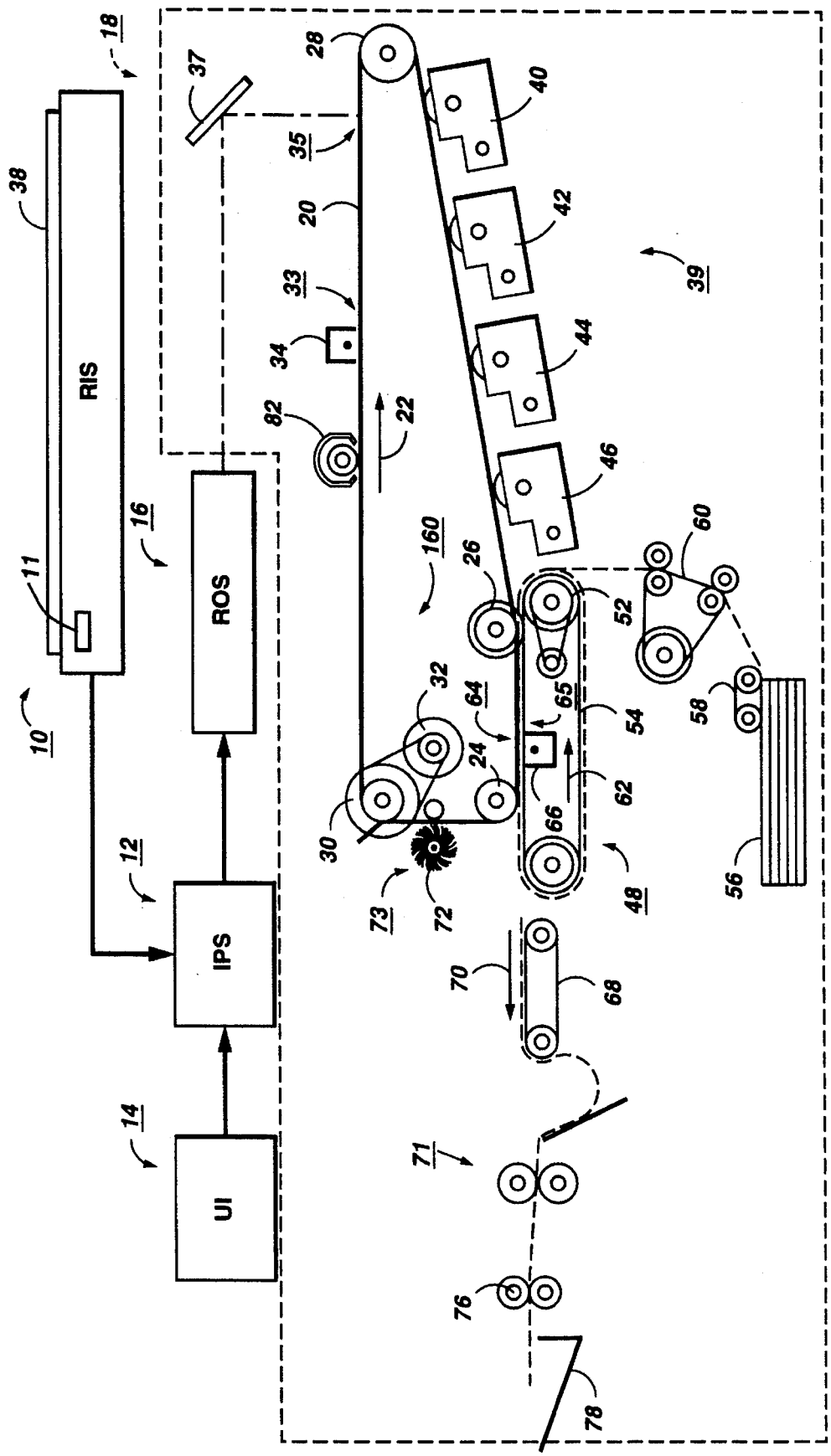
FIG. 10 is a schematic elevational view showing an exemplary electrophotographic printing )machine incorporating features of the present invention therein.

For a general understanding of the features of the present invention, reference is made to the drawings. FIG. 10 is a schematic elevational view showing an electrophotographic printing machine which may incorporate features of the present invention therein. It will become evident from the following discussion that the subsampling apparatus of the present invention is equally Well suited for use in a wide variety of color scanners coupled with printing systems, image memory storage systems and other devices, and therefore are not limited in application to the particular systems shown herein. While the present invention will hereinafter be described in connection with preferred embodiments, it will be understood that it is not intended to limit the invention to a particular embodiment. On the contrary, it is intended to cover all alternatives, modifications and equivalents as may be included within the spirit and scope of the invention as defined by the appended claims.

To begin by way of general explanation, FIG. 10 is a schematic elevational view showing an electrophotographic printing machine which may incorporate features of the present invention therein, it will become evident from the following discussion that the present invention is equally well suited for use in a wide variety of copying and printing systems, and is not necessarily limited in its application to the particular system shown herein. As shown in FIG. 10, during operation of the printing system, a multiple color original document 38 is positioned on a raster input scanner (RIS), indicated generally by the reference numeral 10. The RIS contains document illumination lamps, Optics, a mechanical scanning drive, and a charge coupled device (CCD array) or full width subsampling scanning sensor array 11, such as shown and described in greater detail conjunction with FIGS. 2 and 3 herein. Sensor array 11 of the RIS captures the entire image from original document 38 and converts it to a series of raster scan lines and moreover measures a set of primary color densities, i.e. red, green and blue densities, at each point of the original document. Sensor array 11 transmits chrominance data as electrical signals to an image processing system (IPS), indicated generally by the reference numeral 12. IPS 12 converts the set of red, green and blue density signals to a set of colorimetric coordinates, as more fully described in association with FIGS. 1 through 9 herein.

IPS 12 also contains data control electronics which prepare and manage the image data flow to a raster output scanner (ROS), indicated generally by the reference numeral 16. A user interface (UI), indicated generally by the reference numeral 14, is in communication with IPS 12. UI 14 enables an operator to control the various operator adjustable functions. The operator actuates the appropriate keys of UI 14 to adjust the parameters of the copy. UI 14 may be a touch screen, or any other suitable control panel, providing an operator interface with the system. The output signal from UI 14 is transmitted to IPS 12. The IPS then transmits signals corresponding to the desired image to ROS 16, which creates the output copy image. ROS 16 includes a laser with rotating polygon mirror blocks. Preferably, a nine facet polygon is used. The ROS illuminates, via mirror 37, the charged portion of a photoconductive belt 20 of a printer or marking engine, indicated generally by the reference numeral 18, at a rate of about 400 pixels per inch, to achieve a set of subtractive primary latent images. The ROS will expose the photoconductive belt to record three or four latent images which correspond to the signals transmitted from IPS 12. One latent image is developed with cyan developer material. Another latent image is developed with magenta developer material and the third latent image is developed with yellow developer material. A black latent image may be developed in lieu of or in addition to other (colored) latent images. These developed images are transferred to a copy sheet in superimposed registration with one another to form a multicolored image on the copy sheet. This multicolored image is then fused to the copy sheet forming a color copy.

With continued reference to FIG. 10, printer or marking engine 18 is an electrophotographic printing machine. Photoconductive belt 20 of marking engine 18 is preferably made from a photoconductive material. The photoconductive belt moves in the direction of arrow 22 to advance successive portions of the photoconductive surface sequentially through the various processing stations disposed about the path of movement thereof. Photoconductive belt 20 is entrained about rollers 24 and 26, tensioning roller 28, and drive roller 30. Drive roller 30 is rotated by a motor 32 coupled thereto by suitable means such as a belt drive. As roller 30 rotates, it advances belt 20 in the direction of arrow 22.

Initially, a portion of photoconductive belt 20 passes through a charging station, indicated generally by the reference numeral 33. At charging station 33, a corona generating device 34 charges photoconductive belt 20 to a relatively high, substantially uniform potential.

Next, the charged photoconductive surface is rotated to an exposure station, indicated generally by the reference numeral 35. Exposure station 35 receives a modulated light beam corresponding to information derived by RIS 10 having multicolored original document 38 positioned thereat. The modulated light beam impinges on the surface of photoconductive belt 20. The beam illuminates the charged portion of the photoconductive belt to form an electrostatic latent image. The photoconductive belt is exposed three or four times to record three or four latent images thereon.

After the electrostatic latent images have been recorded on photoconductive belt 20, the belt advances such latent images to a development station, indicated generally by the reference numeral 39. The development station includes four individual developer units indicated by reference numerals 40, 42, 44 and 46. The developer units are of a type generally referred to in the art as "magnetic brush development units." Typically, a magnetic brush development system employs a magnetizable developer material including magnetic carrier granules having toner particles adhering triboelectrically thereto. The developer material is continually brought through a directional flux field to form a brush of developer material. The developer material is constantly moving so as to continually provide the brush With fresh developer material. Development is achieved by bringing the brush of developer material into contact with the photoconductive surface. Developer units 40, 42, and 44, respectively, apply toner particles of a specific color which corresponds to the complement of the specific color separated electrostatic latent image recorded on the photoconductive surface.

The color of each of the toner particles is adapted to absorb light within a preselected spectral region of the electromagnetic wave spectrum. For example, an electrostatic latent image formed by discharging the portions of charge on the photoconductive belt corresponding to the green regions of the original document will record the red and blue portions as areas of relatively high charge density on photoconductive belt 20, while the green areas will be reduced to a voltage level ineffective for development. The charged areas are then made visible by having developer unit 40 apply green absorbing (magenta) toner particles onto the electrostatic latent image recorded on photoconductive belt 20. Similarly, a blue separation is developed by developer unit 42 with blue absorbing (yellow) toner particles, while the red separation is developed by developer unit 44 with red absorbing (cyan) toner particles. Developer unit 46 contains black toner particles and may be used to develop the electrostatic latent image formed from a black and white original document. Each of the developer units is moved into and out of an operative position. In the operative position, the magnetic brush is substantially adjacent the photoconductive belt, while in the nonoperative position, the magnetic brush is Spaced therefrom. During development of each electrostatic latent image, only one developer unit is in the operative position, the remaining developer units are in the nonoperative position.

After development, the toner image is moved to a transfer station, indicated generally by the reference numeral 65. Transfer station 65 includes a transfer zone, generally indicated by reference numeral 64. In transfer zone 64, the toner image is transferred to a sheet of support material, such as plain paper amongst others. At transfer station 65, a sheet transport apparatus, indicated generally by the reference numeral 48, moves the sheet into contact with photoconductive belt 20. Sheet transport 48 has a pair of spaced belts 54 entrained about a pair of substantially cylindrical rollers 50 and 52. A sheet gripper 84 (not shown in FIG. 6) extends between belts 54 and moves in unison therewith. A sheet 25 is advanced from a stack of sheets 56 disposed on a tray. A friction retard feeder 58 advances the uppermost sheet from stack 56 onto a pre-transfer transport 60. Transport 60 advances sheet 25 (not shown in FIG. 10) to sheet transport 48. Sheet 25 is advanced by transport 60 in synchronism with the movement of the sheet gripper. In this way, the leading edge of sheet 25 (not shown in FIG. 6) arrives at a preselected position, i.e. a loading zone, to be received by the open sheet gripper. The sheet gripper then closes securing sheet 25 thereto for movement therewith in a recirculating path. The leading edge of sheet 25 (not shown in FIG. 10) is secured releasably by the sheet gripper. As belts 54 move in the direction of arrow 62, the sheet moves into contact with the photoconductive belt, in synchronism with the toner image developed thereon. In transfer zone 64, a corona generating device 66 sprays ions onto the backside of the sheet so as to charge the sheet to the proper magnitude and polarity for attracting the toner image from photoconductive belt 20 thereto. The sheet remains secured to the sheet gripper so as to move in a recirculating path for three cycles. In this way, three or four different color toner images are transferred to the sheet in superimposed registration with One another.

One skilled in the art will appreciate that the sheet may move in a recirculating path for four cycles when under color black removal is used. Each of the electrostatic latent images recorded on the photoconductive surface is developed with the appropriately colored toner and transferred, in superimposed registration with one another, to the sheet to form the multicolored copy of the colored original document.

After the last transfer operation, the sheet transport system directs the sheet to a vacuum conveyor 68. Vacuum conveyor 68 transports the sheet, in the direction of arrow 70, to a fusing station, indicated generally by the reference numeral 71, where the transferred toner image is permanently fused to the sheet. Thereafter, the sheet is advanced by a pair of rolls 76 to a catch tray 78 for subsequent removal therefrom by the machine operator.

The final processing station in the direction of movement of belt 20, as indicated by arrow 22, is a photoreceptor cleaning apparatus, indicated generally by the reference numeral 73. A rotatably mounted fibrous brush 72 may be positioned in the cleaning station and maintained in contact with photoconductive belt 20 to remove residual toner particles remaining after the transfer operation. Thereafter, lamp 82 illuminates photoconductive belt 20 to remove any residual charge remaining thereon prior to the start of the next successive cycle.

Figure 1:
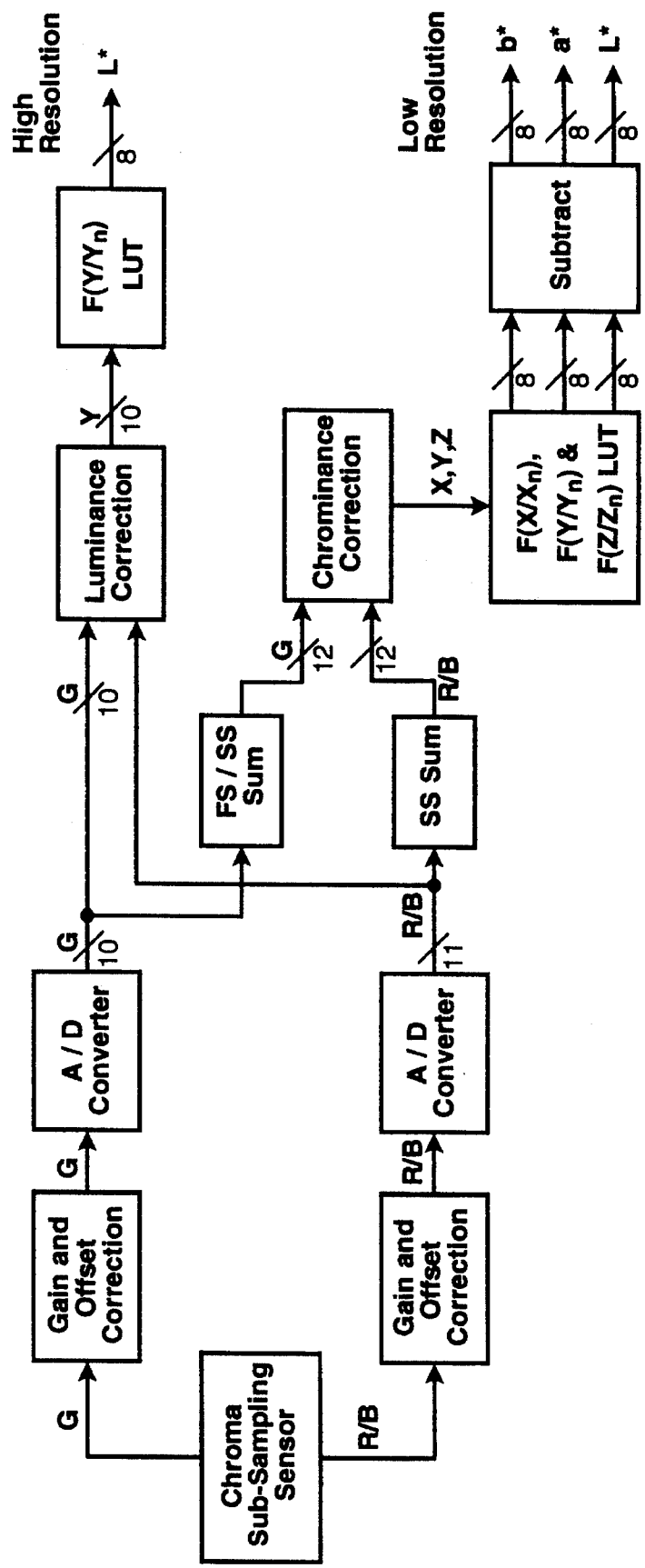
FIG. 1 is a block diagram showing one embodiment of an image processor of the present invention.
Figure 2:
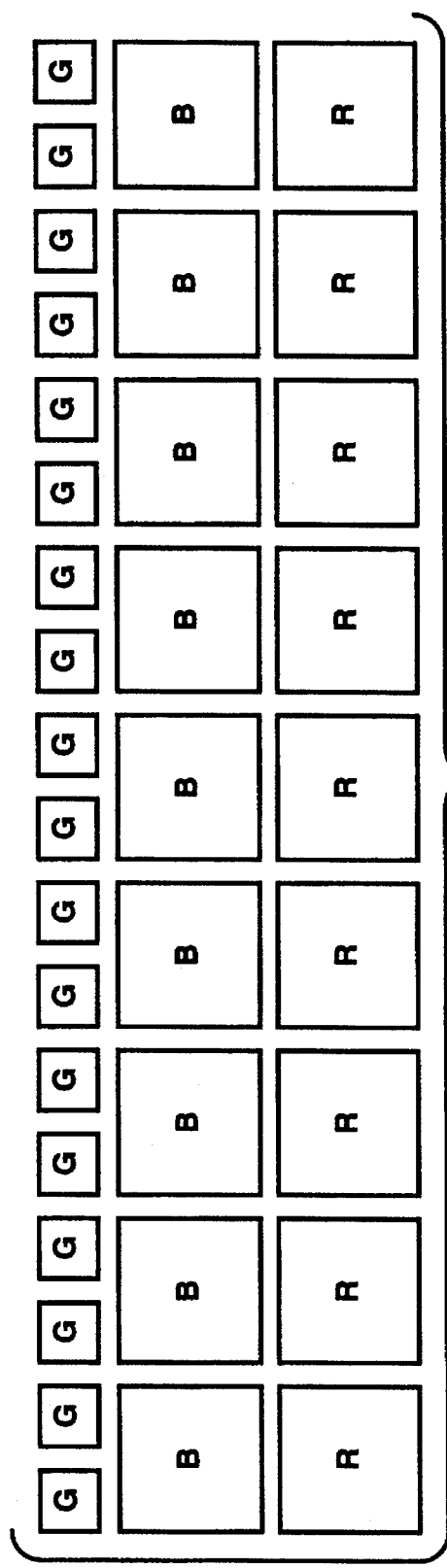
FIG. 2 is an elevational view showing an embodiment of a subsampling sensor array in accordance with the present invention.

FIG. 1 shows a block diagram of an apparatus of the present invention in which the data to be chroma subsampled for storage and transmission is collected by subsampling at the point the chrominance data is received, as a part of the image scanning process. This apparatus may form a part of IPS 12 as shown in FIG. 10, or be a separate image processor that provides subsampled luminance chroma and hue data to ROS 16 and/or a memory storage or other device. The embodiment of the present invention shown in FIG. 1 includes a chroma detection system that provides subsamples at the sensor itself and, which directly outputs the chroma subsampled data. The present invention includes a chroma subsampling sensor arrangement (such as shown in FIG. 2), as well as the FIG. 1 image processor for performing color correction that preserves local color correctness while retaining accurate scanned image edge information. The chroma subsampling processor of the present invention provides for much needed data reduction for color image chrominance subsampling by employing a means that subsamples the scanned image at the point of the sensor array, rather than relying on processing and storage hardware and software to carry out the subsampling process. The present invention increases chrominance data precision by summing the sensor data. In that this subsampled scanning approach is carried out on a linear chroma subsampling sensor, all subsequent color image processing is performed on the subsampled data.

According to the FIG. 1 block diagram, the system employs two video channels. One is the luminance channel, G, and the other is a multiplexed chrominance channel, R/B. The luminance G channel output is at the full resolution of the scanner and is relied upon to provide luminance intensity and edge information. The chrominance channel spatial sampling resolution is one half of luminance in both fast and slow scan direction, again due to the sensor arrangement more fully described in association with FIG. 2. Analog to digital conversion is performed by each relevant A/D Convertor. Scanner subsampling is performed on the luminance channel output by averaging (summing) these full resolution green sensor outputs (covering a four pixel area). Other arrangements permitting further levels of subsampling (such as ¼ chrominance channel spatial sampling resolution relative to luminance in the fast and/or slow scan direction) is also possible employing the present invention, using appropriately configured sensor arrays and processors.

The G and R/B signals from the subsampling sensor are thereafter processed to provide a high spatial resolution luminance (L*) channel and a lower resolution L*a*b* (chrominance) channel. The low resolution L* channel is interpolated according to the a* and b* computation. The subsampled high resolution) L* component is retained with the subsampled chroma channels to perform color processing operations. Operations such as color histogram creation, color marker detect, color substitution, etc., may also be performed in the subsampled domain to reduce the speed requirements. While the chrominance channel is spatially subsampled, the bit-precision of the chrominance channel is four times that of the luminance channel before all signals are converted to the CIELAB space. This improved precision attained by the processor of the present invention results from the sensor-inherent summation of adjacent pixels with the R and B sensors with the results of that summation being used throughout all subsequent image processing operations.

Figure 3:
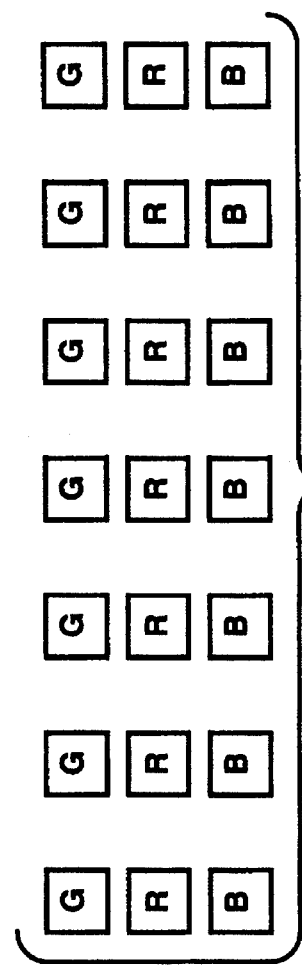
FIG. 3 is an elevational view showing a prior art sensor array.

The color sensor scanning arrays used in document scanners (to include the prior art array shown in FIG. 3) generally employ three rows of linear sensor covered with different color filters. Such arrays span the width of the sheet to be scanned in what is termed as the "fast scan direction", that is, back and forth across the width of the sheet and along the length of the sensor arrays shown in FIGS. 2 and 3. Such arrays (also as shown in FIGS. 2 and 3) are generally are three colored (filtered) sensors deep; the array moves back and forth along the length of the sheet in a slow scan direction perpendicular to the length of the array and to slow scan direction movement. Normally (and for purposes of describing the present invention), the slow scan direction is also the same as the "process direction", or the direction Of photoreceptor belt, roller and sheet movement; the present invention is not restricted to the process direction being the same as the slow scan direction.

Each of the optical filters cover a different part of the optical spectrum. Each of the sensor arrays must be rectified or corrected for chrominance gain and offset variations (as shown and described in association with FIG. 1), unless the level of precision required in the output does not require modification according to the color filter deviations or imperfections in the filters and/or photosensors used in subsampling. This chrominance gain and offset operation is identical to the operation is similar to the gain and offset correction that must be performed with monochrome (black and white) single element sensors. Due to R/B multiplexing, as shown in FIG. 1, only two processors are required to complete this task (unless no correction of the color filters is desired or required in a particular application). Also as shown in FIG. 1, depending on the use(s) to be made of the subsampled scanner output, amplification and scan line delay processing may be performed on both channels employed with this embodiment of the present invention (not shown in FIGS. 1 or 4), much the same as it also performed with monochrome, single element sensors. Further details regarding such amplification or "shading" and the scan line delay processing/circuitry that may be used to align and modify the color component outputs are not included herein, as these details do not impact the chroma subsampling performed according to the present invention. The chroma subsampling taught by the present invention will, however, help reduce the complexity and hardware/software requirements amount of color data requiring shading and scan delay correction.

FIG. 2 shows a subsampling arrangement of the chroma sensing elements. In the color subsampling sensor shown in FIG. 2, the red and blue (R and B) color elements cover four times the area of the green (G) elements. Although the overall area occupied by the color sensing elements (red and blue sensors, as described above in association with FIG. 1) are much larger than the luminance sensing elements (green sensors, also as described above in association with FIG. 1), the total number of chrominance sensing and the total number of luminance sensing elements are equal, providing for simultaneous real time balanced processing of the luminance and chrominance outputs. As such, the chroma subsampling sensor array shown in FIG. 2 can be employed so as to only require the equivalent capacity of two monochrome image processors, to include only having twice the control, amplification and correction circuitry as required by such monochrome.

The colored optical filters used in the sensor array must be designed to optimize color separation. Ideally, each color filter would be designed such that its spectral response matches the tristimulus response of the human eye as closely as possible. Deviations of the spectral response of the optical filters from the tristimulus response can be adjusted by combining the three sensor signals. The quality factor of the optical filters depends on how precisely (and easily) the color signals can be corrected to match the tristimulus responses using simple linear combinations of the three color signals according to the 3×3 matrix transform operation later described herein. The color filters must also be designed so as to balance the color quality factor of the filter and its light transmissivity characteristics. In a preferred embodiment, the green sensor in particular employs a filter that matches in as precise a manner as possible the y tristimulus response required for the full resolution luminance (L*) output channel. With the four times greater increased sensing area of the red and blue components, the transmissivity requirements of the red and blue filters can to some degree be relaxed, as needed or desired in favor of improved separation or other factors. Depending on the application, the light transmissivity characteristics or quality of the R and B (red and blue) filters can be usefully traded off in favor of improved color quality factors, as these filters each cover an area four times that of each green sensor as shown in FIG. 2. Further, the desired (full resolution) luminance and edge definition is provided by the high resolution G (green filtered) sensor.

The number of processing bits necessary to digitize the RGB signals produced by the FIG. 2 array is arrived at by assessing the requirements to generate the L*a*b* space. The L*a*b* color space is theoretically uniform, although a precisely uniform space might never be found due to the complex and adaptive nature of the human visual system. Each separation or increment of the uniform L*, a* or b* color space value is intended to reflect a threshold (or slightly above threshold) level of human detectability. By using the transform from the RGB values to CIELAB space, an accurate approximation of the precision needed in the RGB space according to the precision requirements for the L*a*b* color space can be determined. The bit processing requirements for employing analog to digital (A/D) conversion in the present invention are shown in FIG. 1, along with the other bit resolution requirements of the present invention as indicated between each relevant functional block.

Again, as described above, the optical filters employed (when combined with all the other optical spectral responses) are ideally matched precisely to the human tristimulus responses. Since such "perfect" matching is extremely difficult, approximations must be used. Mathematically, the widely used RGB to CIELAB transformation is done in two steps. In the first step, the RGB values are transformed to the tristimulus XYZ values. The first step of the transform (which is shown in FIG. 1 as the "Chrominance Correction" block) combines the RGB values so as to generate the XYZ tristimulus values. Thereafter in the second step of the transform (shown in FIG. 1 as the "$F(X/X_n)$, $F(Y/Y_n)$ & $F(Z/Z_n)$ LUT" block), the XYZ values are converted to L*a*b* values.

Assuming that color correction is performed on a linear combination of the RGB values the precision requirement is the same for the RGB values and the XYZ values. The first step of the transform is a 3×3 matrix operation, performed according to the following equations:

$$X = a_{00}R + a_{01}G + a_{02}B$$

$$Y = a_{10}R + a_{11}G + a_{12}B$$

$$Z = a_{20}R + a_{21}G + a_{22}B$$

The second step is a non-linear transform of the individual XYZ tristimulus values from the first step into the L*a*b* chrominance output values. This transform is performed according to the following equations:

$$L^* = 116f(Y/Y_n)$$
$$a^* = 500f(X/X_n) - 500f(Y/Y_n)$$
$$b^* = 200f(Y/Y_n) - 200f(Z/Z_n)$$
$$b^* = 200f(Y/Y_n) - 200f(Z/Z_n)$$

wherein, $f(t) = 7.787\ t$     (for $0 \leq t \leq 0.008856$)

and $f(t) = t^{1/3} - 16/116$     (for $1 \geq t > 0.008856$)

These equations used in the second step conversion from XYZ to L*a*b* can be done with the multifunction LUT (look up table) as shown in FIG. 1 for each RGB component, followed by a simple subtraction operation (also shown in FIG. 1) to develop the a* and b* values.

Figure 6:
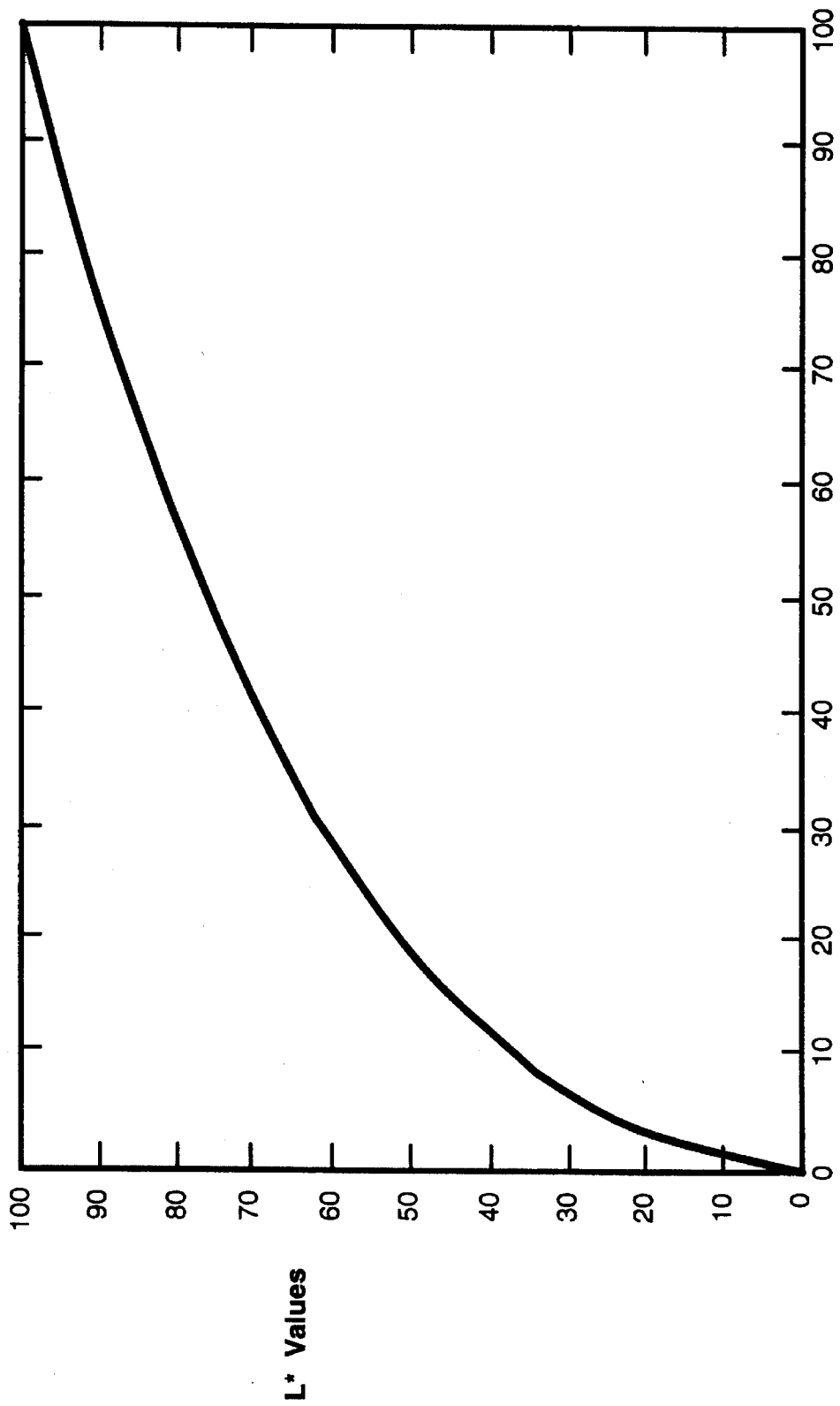
FIG. 6 is graphical representation of luminance values versus Y tristimulus values.

Determining the numerical bit resolution requirement of the XYZ values (which is assumed be the same as RGB bit resolution requirement) requires an examination of the transform of Y to L*. FIG. 6 shows a plot of luminance L* vs. Y tristimulus value. FIG. 1 reflects the determination that in each output case (High Resolution L* and Low Resolution L*, a* and b*), 8 bit resolution is required. Accordingly, as assumed, each "$F(X/X_n)$, $F(Y/Y_n)$ & $F(Z/Z_n)$ LUT" block output also requires 8 bit resolution.

Figure 7:
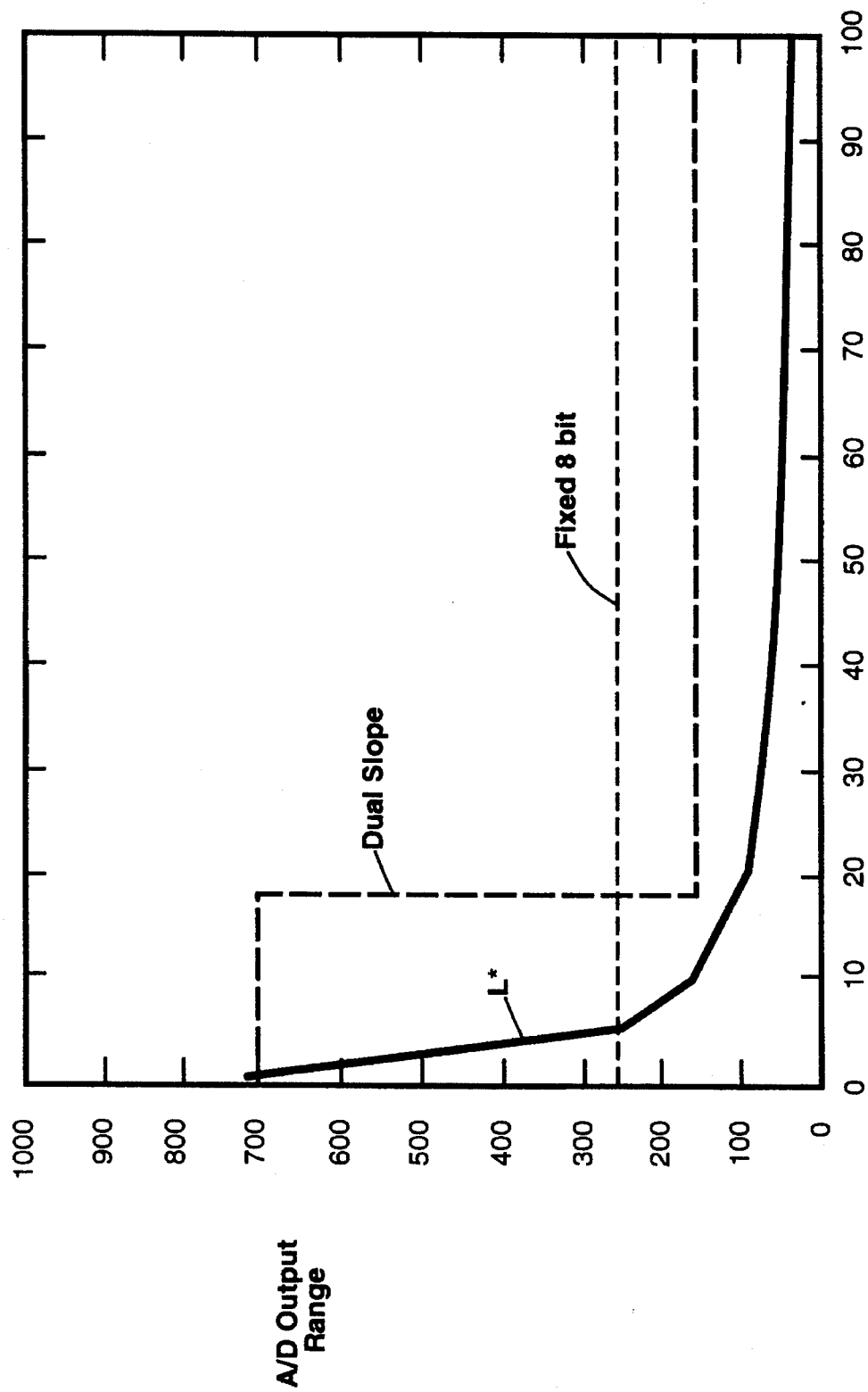
FIG. 7 is graphical representation of dual slope A/D transfer characteristics.

As the High resolution L* is not linearly related to Y, additional numerical resolution in Y is desired to obtain 100 uniform gradients in the High Resolution (L*) output. FIG. 7 shows the "L*" line plot for the luminance component. The vertical axis shows the number of levels (divisions) for Y required to produce 1/100th increments of L* for the different Y tristimulus values. Further, according to the FIG. 7 "Dual Slope" analog to digital conveyor plot, it can be seen that more than 8 bits are required to represent Y in the regions with Y values lower than 4.5 or roughly at densities above about 1.35. As such, the preferred Luminance Correction output requires 10 bit resolution of the Y values so that the only areas that Y runs out of precision is below 1, or when density is about 2, which should exceed the resolution required for most other areas of the image. Also as shown in FIG. 7, the dual slope A/D conversion provides about 10 bit precision up to Y values of 18.

Figure 5:
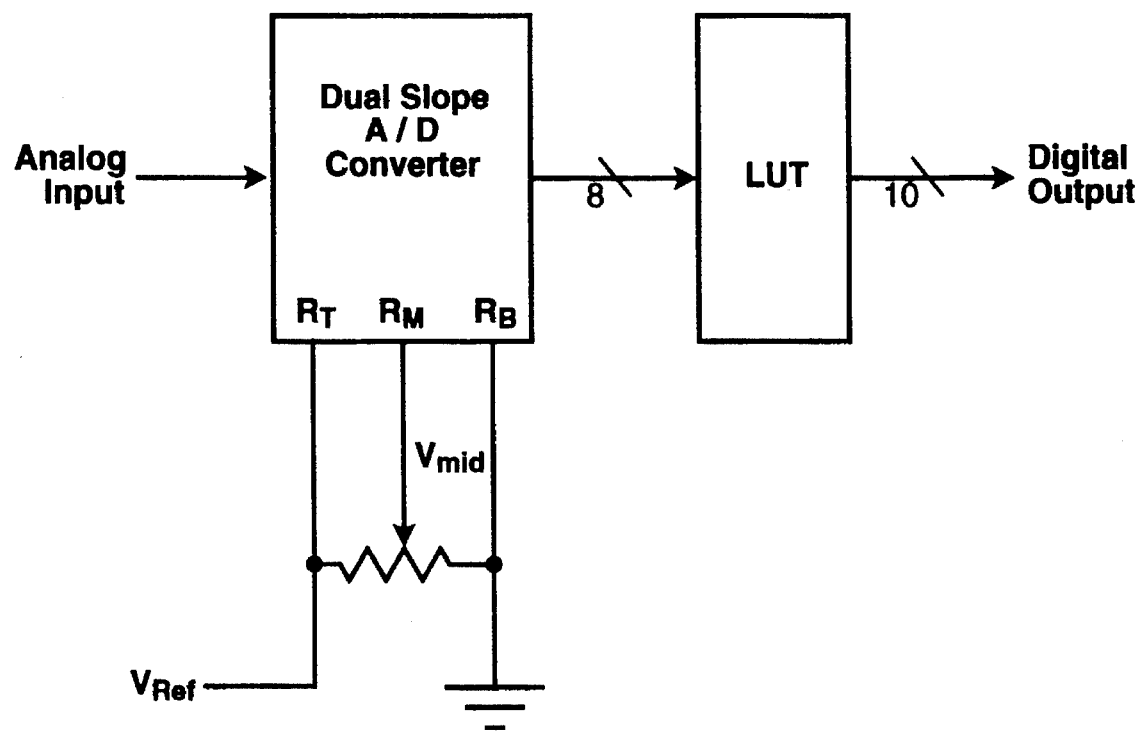
FIG. 5 is a block diagram showing a dual-slope A/D converter that may be employed in the present invention.
Figure 8:
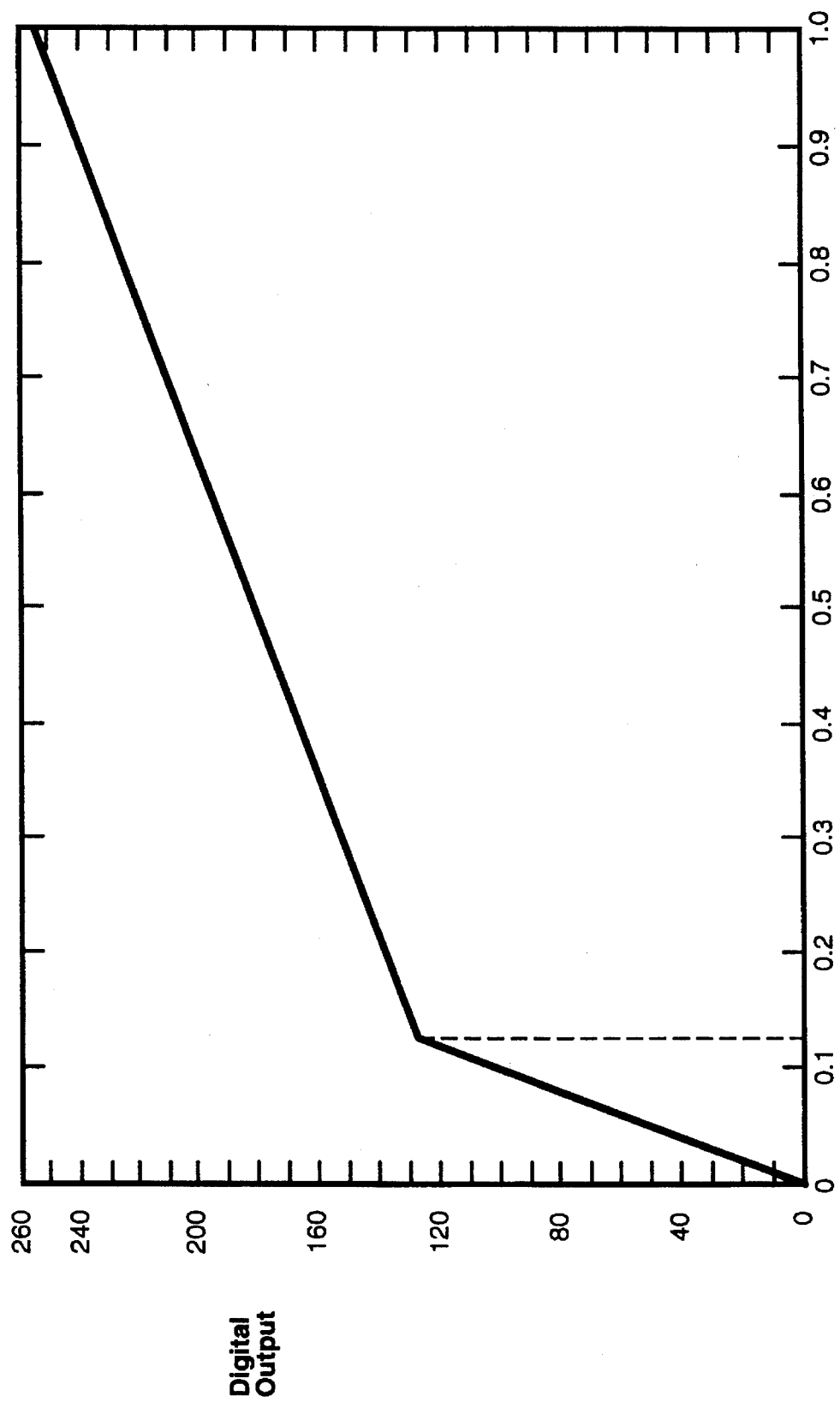
FIG. 8 is graphical representation of the A/D range (slope) of the luminance component of the color space conversion.

This dual slope solution may be desirably employed using a nonlinear 8-bit A/D converter. As the output of such an A/D converter is not linear, it will require conversion back to a linear output using a look up table (see the "$F(Y/Y_n)$LUT" block shown in FIG. 1). FIG. 5 shows a block diagram of how such an 8-bit a dual slope analog input A/D Converter may be implemented with a LUT. This dual slope A/D convertor provides digital output according to a first ratio below a preselected analog voltage input value. Above the level of that preselected analog voltage input value, the digital output is provided according to a second ratio. The employment of these two ratios to convert analog inputs to digital outputs provide the convertors desirable "dual slope" output capability. FIG. 8 shows the plot of the performance characteristics to be employed when such an 8 bit resolution A/D Converter is used. The LUT used to achieve this dual slope conversion has value that will convert the input range linearly from 0 to 127 to output values from 0 to 128. From 128 to 255, the input values are linearly converted to range of values from 129 to 1023. Such dual slope A/D conversion may be used to selectively improve the A/D conversion precision otherwise achieved with A/D converters. By controlling the mid-point reference of the A/D converter, the transfer characteristics of the A/D converter can be modified as shown in FIG. 8. The mid-point reference input ($R_M$) controls the break point of the converter between the high to low value inputs ($R_T$ to $R_B$) as shown in the FIG. 5 block diagram and demonstrated in the FIG. 8 analog to digital conversion plot. A preselected slope break point ($V_{mid}$) (FIG. 5) is shown as 0.125 in FIG. 8, as indicated by the vertical dotted line intersecting the dual slope line. (Other preselected slope break points may be alternatively employed in differing situations.) In this manner, the output of the A/D Converter remains at 8 bit, while the effective bit precision has been divided into two regions. The region to the left of the dotted line in FIG. 8 has an effective precision of $127/V_{mid}$ levels of resolution, while the region to the right of the dotted line has an effective precision of 127/(1.0−$V_{mid}$). As such, the precision for the analog input from 0 to 0.125 requires about 10 bits, whereas the precision for the analog input values from 0.125 to 1.0 requires about 7 bits; this higher (10 bit) requirement is reflected in FIG. 1.

Figure 9:
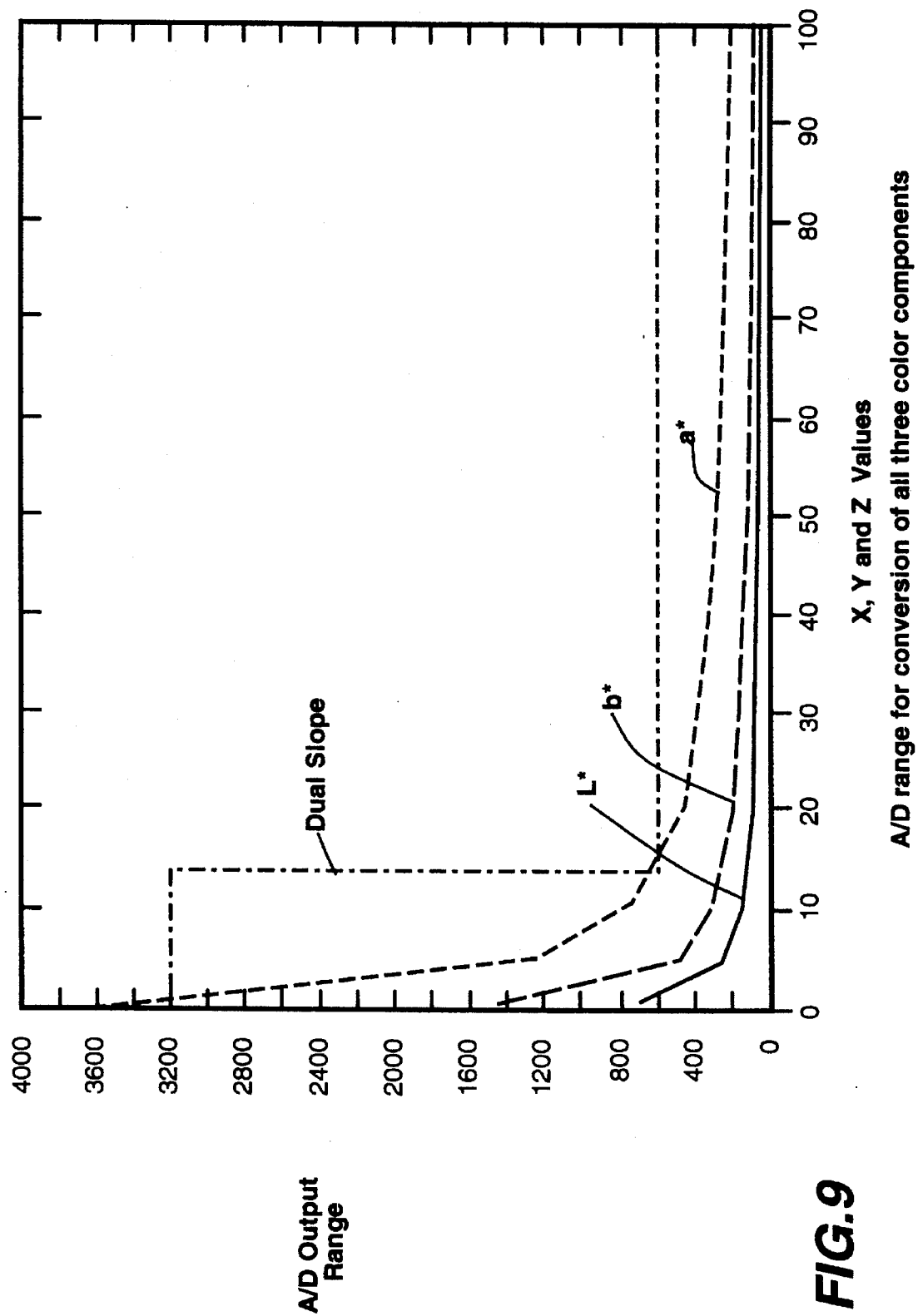
FIG. 9 is graphical representation of the A/D range (slope) conversion of the X, Y and Z tristimulus components.

As for the R/B multiplexed output, the A/D Converter shown in FIG. 1, a* and b* depend on the difference of the non-linearly transformed X, Y and Z values. (As previously described, low resolution L* is derived from a* and b*) FIG. 9 shows a plot of the A/D range plot for conversion of the three low resolution color component L*, a* and b* values vs. X, Y and Z values. According to the L*, a* and b* value plots, the numerical bit resolution for X and Y to generate a* is approximately 12 bits, while the numerical bit resolution for Y and Z to generate b* is approximately 11 bits. (See these bit requirements as also reflected on FIG. 1). As the a* and b* components may be completed by the same hardware, all X, Y and Z data may be processed at 12 bit resolution. The dual slope A/D approach may also be applied for these low resolution chroma components. As previously discussed, the numerical resolution of Y has to be 10 bits for L*. This could be achieved by using a 10 bit A/D converter or the dual slope A/D approach. Generation of the a* and b* values, however, requires that the X, Y and Z values to be 12 bits. Since the spatial resolution of a* and b* is lower, the X, Y and Z values used to generate a* and b* can be produced by the summation of four G samples and two pixel of the R and B channels. Summing increases the precision and signal to noise ratio of the RGB values.

Luminance correction is performed in the linear space with 10 bit input precision and at the base scanner spatial resolution. As previously discussed, the green optical filter should match the Y tristimulus response as closely as possible. If the response of the green filter is closely matched the Y tristimulus response, the luminance correction operation (as represented in the FIG. 1 "Luminance Correction" block, including inputs from the multiplexed R/B channel) might be eliminated. When the green filter does not adequately match the Y tristimulus response, the required Y value can be derived according to the following equations:

$$Y_{n,n} = aR_{n,n+1,n,n+1}\frac{4G_{n,n}}{G_{total}} + bG_{n,n} + cB_{n,n+1,n,n+1}\frac{4G_{n,n}}{G_{total}}$$

$$Y_{n+1,n} = aR_{n,n+1,n,n+1}\frac{4G_{n+1,n}}{G_{total}} +$$

$$bG_{n+1,n} + cB_{n,n+1,n,n+1}\frac{4G_{n+1,n}}{G_{total}}$$

$$Y_{n,n+1} = aR_{n,n+1,n,n+1}\frac{4G_{n,n+1}}{G_{total}} +$$

$$bG_{n,n+1} + cB_{n,n+1,n,n+1}\frac{4G_{n,n+1}}{G_{total}}$$

and $$Y_{n+1,n+1} = aR_{n,n+1,n,n+1}\frac{4G_{n+1,n+1}}{G_{total}} +$$

$$bG_{n+1,n+1} + cB_{n,n+1,n,n+1}\frac{4G_{n+1,n+1}}{G_{total}}$$

where $$G_{total} = G_{n,n} + G_{n+1,n} + G_{n,n+1} + G_{n+1,n+1}$$

The subscripts in the above equations designate the two dimensional pixel locations, while the designations a, b and c are the color correction coefficients. Also note that R and B have four subscripts since they represent summed values for four neighboring pixels "n,n", "n+1,n", "n,n+1", and "n+1,n+1" (The factor of 4 in the equations is used to maintain the correct scale of the equations.) These equations are used to preserve the local color over the summed four pixel area used for luminance (see the G sensors of FIG. 2). At the same time, the contrast or edge sharpness of the G sensors is also preserved in the Y output. According to these equations, the summed or averaged R and B information is distributed to the Y values in proportion to the G values. Summation of the four Y values obtained from the above equations is achieved according to the following equation:

$$Y_{n,n}+Y_{n+1,n}+Y_{n,n+1}+Y_{n+1,n+1} = 4aR_{n,n+1,n,n+1}+bG_{total}+4cB_{n,n+1,n,n+1}$$

The right side of the above equation demonstrates that the total luminance of the four pixels equals the sum of each of the RGB color components weighted by the color correction factors a, b and c. This contrast between two pixels located at n,n and n,n+1 of the high resolution luminance (G) component and of the corrected Y tristimulus value can be expressed, respectively, according to the equations:

$$\text{Contrast of } G = \frac{G_{n,n} - G_{n,n+1}}{G_{n,n} + G_{n,n+1}} \quad \text{Eq. B-7}$$

$$\text{Contrast of } Y = \frac{Y_{n,n} - Y_{n,n+1}}{Y_{n,n} + Y_{n,n+1}}$$

By substitution, the contrast of the corrected Y component may be shown to be equivalent to the contrast of the luminance (G) component, demonstrated as follows:

$$\text{Contrast of } Y = \frac{G_{n,n} - G_{n,n+1}}{G_{n,n} + G_{n,n+1}}$$

As such, the gray level of the combined 4 pixels is preserved. Further, as sharpness of the image scanned can be viewed as the contrast between pixels, in that the gray level contrast between pixels is preserved, no sharpness of the image is lost. (This luminance (G) correction assumes that the G channel contains all the edge information, such that the spectral response of the G filter is able to detect the edges of all colors scanned.)

Chrominance correction is performed on the 12 bit summed RGB data. Since the chrominance correction computation is at one quarter the rate of the luminance correction, it is conceivable that the hardware cost for chrominance correction could be reduced by time multiplexing the computations. Chrominance correction may be performed using a linear combination of the RGB values or with higher order RGB combinations. The conversion of the color corrected XYZ tristimulus values can be converted to CIELAB (using the 3×3 matrix equations previously discussed) using a single look up table ("F(X/$X_n$), F(Y/$Y_n$) & F(Z/$Z_n$) LUT" block shown in FIG. 1) for each of the XYZ components. L* is determined by the look up table output result of the Y component of this 3×3 matrix; the a* and b* values are the difference of the LUT results from the XY and the YZ components, respectively. It should be noted that in order to obtain improved precision for the a* and b* components, the G values should be generated for computation of the chrominance components must be as precise as possible. (This is achieved by summing the G component in both the slow and fast scan direction over the four pixel area discussed above.)

Figure 4:
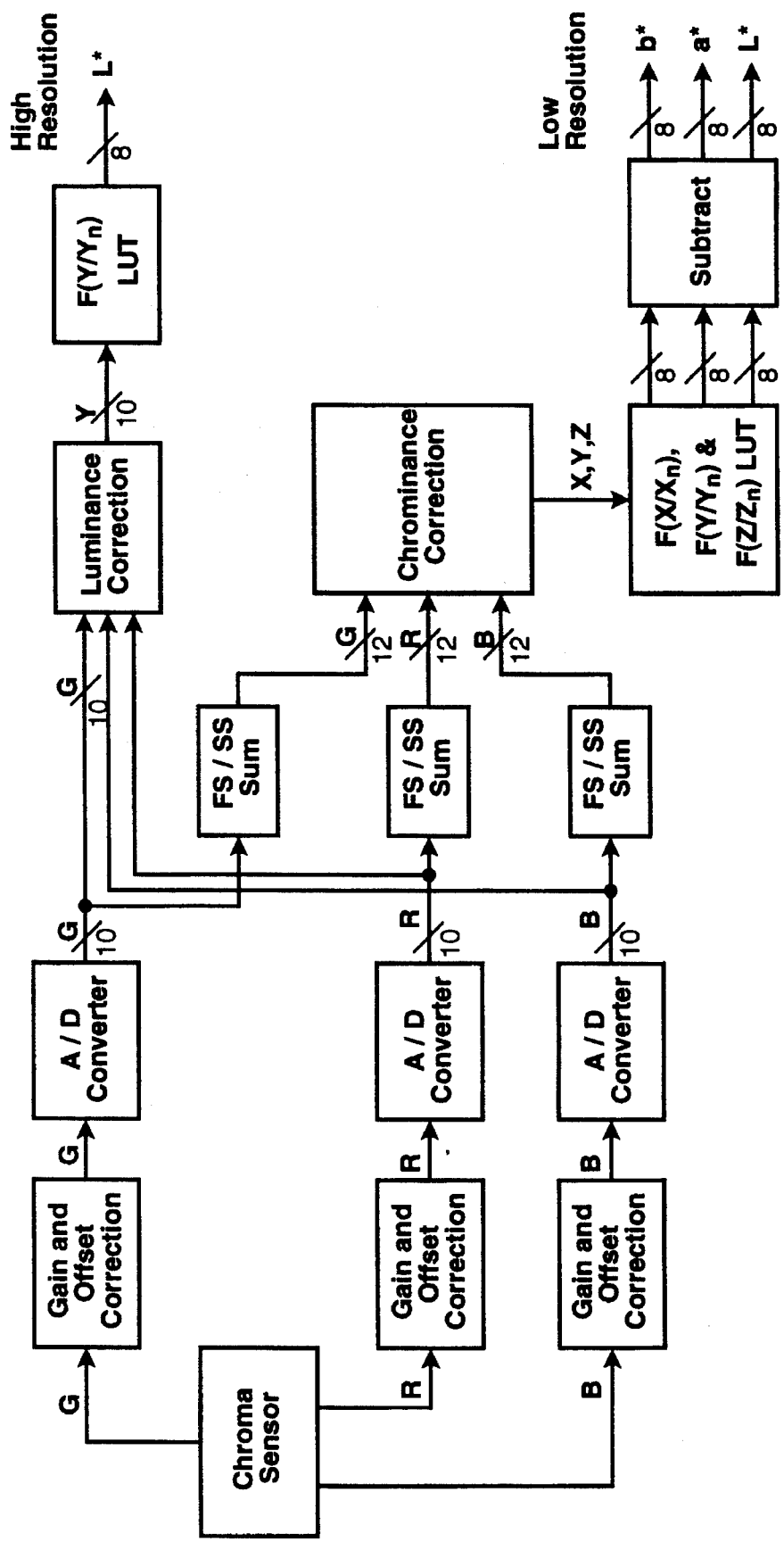
FIG. 4 is a block diagram showing another embodiment of an image processor of the present invention.

Chroma subsampling can also be done in the digital domain using a prior art 3-row array as shown in FIG. 3. FIG. 4 shows a block diagram of a main processor which uses separate (non-multiplexed) G, R and B channels to sum chrominance data using outputs from CCD or full width arrays having equal-sized red, green and blue sensors such as are shown in FIG. 3. The FIG. 4 main processor determines a high resolution luminance according to a luminance output of the green sensors and a low resolution subsampled chrominance output according to a set of summed green, red and blue Sensor outputs; thereafter, chrominance outputs are transformed by the main processor into X, Y and Z tristimulus values and thereafter to color corrected L*, a* and b* values which correspond to the features of the object being scanned according to the same procedures and equations as described above in association with FIG. 1.

The FIG. 4 main processor preferably includes a pretransformation green, red and blue channel gain and offset delay processors for chrominance output precision. The main processor also preferably includes as shown in FIG. 4 pretransformation green, red and blue channel analog to digital conveverters for increasing chrominance output precision. Each sensor input to the FIG. 4 main processor must be rectified or corrected for chrominance gain and offset variations (as shown in FIG. 1), unless the level of precision required in the output does not require modification of one or more sensors according to the color filter deviations or imperfections in the filters and/or photosensors used in subsampling. This chrominance gain and offset operation performed on each sensor channel (G, R and B), an is similar to the gain and offset correction that must be performed with monochrome (black and white) single element sensors. Depending on the use(s) to be made of the processor output, amplification and scan line delay processing may be performed (also as performed with monochrome, single element sensors) on each channel employed with this embodiment of the present invention. Further details regarding "shading" circuitry and scan line delay circuitry that may be used to align and modify the color component outputs are not included herein, as these details do not impact the chroma subsampling being performed by the present invention.

The colored optical filters used in the scanning array preferably optimize color separation. Ideally, each color filter would be designed such that its spectral response matches the tristimulus response of the human eye as closely as possible. Deviations of the spectral response of the optical filters from the tristimulus response can be adjusted by combining the three sensor signals. The quality factor of the optical filters depend in part on how precisely and/or easily the color signals can be corrected to match the tristimulus responses using simple linear combinations of the three color signals according to the two step transform operation previously described. The color filters desirably balance the color quality factor of the filter and its light transmissivity characteristics, with the green sensor in particular employs a filter that matches in as precise a manner as possible the y tristimulus response required for the full resolution luminance (L*) output channel.

The number of processing bits necessary to digitize the R, G and B channels according to the FIG. 4 main processor are arrived at in the same manner as described above in association with FIGS. 1 and 2, and are shown as the output following each relevant operation. As indicated on FIG. 4, the only differences lies in the A/D Converters for the R and B channels; without multiplexing, each requires 10 bits to process (or may be processed by dual slope(two ratio) A/D convertors also as described above).

As also previously described, the optical filters employed (when combined with all the other optical spectral responses) are ideally matched precisely to the human tristimulus responses. Since such "perfect" matching is physically impossible, an approximation must be used. Mathematically, the widely used RGB to CIELAB transformation is done in two steps. In the first step, the RGB values are transformed to the tristimulus XYZ values. The first step of the transform (which is shown in FIG. 4 as the "Chrominance Correction" block) combines the RGB values so as to generate the XYZ tristimulus values. Thereafter in the second step of the transform (shown in FIG. 4 as the "$F(X/X_n)$, $F(Y/Y_n)$ & $F(Z/Z_n)$ LUT" block), the XYZ values are converted to L*a*b* values, followed by a simple subtraction operation (block also shown in FIG. 4) to develop the a* and b* values.

Luminance correction, as necessary, is performed in the linear space with 10 bit input precision and at the base scanner spatial resolution. As previously discussed, to the extent the green optical filter does not match the Y tristimulus response, the luminance correction operation (as represented in the FIG. 4 "Luminance Correction" block, including inputs from the R and B channel) might be eliminated. When the green filter does not adequately match the Y tristimulus response, the required Y value can be derived according to the "$F(Y/Y_n)$ LUT" block also in FIG. 4, according toto the luminance are converted equations described above in association with FIG. 1.

The present invention as described in association with FIGS. 1 through 9, may be utilized with respect to a digital copier/printing machine such as shown in FIG. 10, and/or with other devices which can utilize a subsampling sensor and/or processor output. While the invention has been described with reference to the various embodiments disclosed above, it is not confined to the details set forth above, but is intended to cover such modifications or changes as may come within the scope of the attached claims.

What is claimed is:

1. An apparatus for sensing and subsampling luminance and chrominance of features on an object being scanned in a fast scan direction and a slow scan direction, comprising:

an array of n subsampling sensor sets spanning a fast scan direction width of n times 2 pixels, each of said sensor sets including, aligned in a slow scan direction column, a set of 2 pixel-sized green sensors aligned in a fast scan direction line for determining pixel-by-pixel green color and luminance, a red sensor extending 2 pixels wide in said fast scan direction and m pixels long in said slow scan direction for detecting red color, and a blue sensor extending m pixels wide in said fast scan direction and 2 pixels long in said slow scan direction for detecting blue color; and a main processor for determining a high resolution luminance according to a luminance output of said green sensors whereby said luminance outputs are transformed into Y tristimulus values and thereafter to high resolution L* values corresponding to the features of the object and a low resolution subsampled chrominance output according to said red sensor and said blue sensor color determinations whereby said luminance and chrominance outputs are transformed into X, Y and Z tristimulus values and thereafter to color corrected L* a* and b* values corresponding to the features of the object, wherein said red sensor and said blue sensor outputs are multiplexed for transmission on a chrominance channel prior to transformation into the X, Y and Z tristimulus values, wherein said green sensor outputs are transmitted On a luminance channel and wherein said main processor comprises a first, pretransformation dual output analog to digital converter for receiving analog voltage inputs from the chrominance channel, and a second pretransformation dual output analog to digital converter for receiving analog voltage inputs from the luminance channel, whereby each converter provides digital outputs according to a first ratio of corresponding analog inputs up to a preselected voltage input value and whereby each converter provides the digital outputs according to a second ratio of corresponding analog inputs above the preselected voltage input value.

2. Am apparatus for sensing and subsampling luminance and chrominance of features on an object being scanned in a fast scan direction and a slow scan direction, comprising:

an array of n subsampling sensor sets spanning a fast scan direction width of n times m pixels, each of said sensor sets including, aligned in a slow scan direction column,
a set of m pixel-sized green sensors aligned in a fast scan direction line for determining pixel-by-pixel green color and luminance,
a red sensor extending m pixels wide in said fast scan direction and m pixels long in said slow scan direction for detecting red color, and
a blue sensor extending m pixels wide in said fast scan direction and m pixels long in said slow scan direction for detecting blue color; and a main processor for determining a high resolution luminance according to a luminance output of said green sensors whereby said luminance outputs are transformed into Y tristimulus values and thereafter to high resolution $L^*$ values corresponding to the features of the object and a low resolution subsampled chrominance output according to said red sensor and said blue sensor color determinations, whereby said luminance and chrominance outputs are transformed into X, Y and Z tristimulus values and thereafter to color corrected $L^*$, $a^*$ and $b^*$ values corresponding to the features of the object, wherein the main processor comprises a pretransformation chrominance channel summing processor for increasing a chrominance output precision, and a pretransformation luminance channel summing processor for increasing a luminance output precision and wherein said chrominance channel summing processor sums a quantity m of red color detections from said red sensors and m blue color detections from said blue sensors, and wherein said luminance channel summing processor sums 2 times m green sensor detections of luminance from said green sensors.

3. An apparatus for sensing and subsampling luminance and chrominance of features on an object being scanned in a fast scan direction and a slow scan direction by an array having green, red and blue sensors, comprising a main processor for determining a high resolution luminance according to a luminance output of said green sensors and a low resolution subsampled chrominance output according to a summed green sensor output of n ,green sensors, a summed red sensor output of n red sensors and a summed blue sensor output of n blue sensors, whereby said luminance and chrominance outputs are transformed by said main processor into X, Y and Z tristimulus values and thereafter to $L^*$, $a^*$ and $b^*$ values corresponding to said features of the object, wherein said red sensor outputs are transmitted on a red channel, said blue sensor outputs are transmitted on a blue channel and said green sensor outputs are transmitted on a green channel prior to transformation into the X, Y and Z. tristimulus values and wherein said main processor comprises a pretransformation red channel dual output analog to digital converter, a pretransformation blue channel dual output analog to digital converter and a pretransformation green channel dual output analog to digital converter, wherein each red, blue and green channel dual output analog to digital converter provides said digital outputs according to a first ratio of corresponding analog inputs up to a preselected voltage input Value and whereby and whereby each red, blue and green channel dual output analog to digital converter provides said digital outputs according to a second ratio of corresponding analog inputs above said preselected voltage input value.

4. An electrophotographic printing machine having an apparatus for sensing and subsampling luminance and chrominance of a sheet having multicolored indicia thereon, and means responsive to $L^*$ $a^*$ and $b^*$ values for reproducing a copy of the sheet being scanned in a fast scan direction and a slow scan directing, said apparatus comprising:

an array of n subsampling sensor sets spanning a fast scan direction width of n times m pixels, each of said sensor sets including, aligned in a slow scan direction column,
a set of 2 pixel-sized green sensors aligned in a fast scan direction line for determining pixel-by-pixel green color and luminance,
a red sensor extending 2 pixels wide in said fast scan direction and 2 pixels long in said slow scan direction for detecting red color, and
a blue sensor extending 2 pixels wide in said fast scan direction and 2 pixels long in said slow scan direction for detecting blue color; and a main processor for determining a high resolution luminance according to a luminance output of said green sensors whereby said luminance outputs are transformed into Y tristimulus values and thereafter to high resolution $L^*$ values corresponding to the multicolored indicia on the sheet and a low resolution subsampled chrominance output according to said red sensor and said blue Sensor color determinations whereby said luminance and chrominance outputs are transformed into X, Y and Z tristimulus values and thereafter to color corrected $L^*$ $a^*$ and $b^*$ values corresponding to the multicolored indicia on the sheet, wherein said red sensor and said blue sensor outputs are multiplexed for transmission on a chrominance channel prior to transformation into the x, Y and Z tristimulus values and wherein said green sensor outputs are transmitted on a luminance channel and wherein said main processor comprises a first pretransformation dual output analog to digital converter for receiving analog voltage inputs from the chrominance channel, and a second pretransformation dual output analog to digital converter for receiving analog voltage inputs from the luminance channel, whereby each converter provides digital outputs according to a first ratio of corresponding analog inputs up to a preselected voltage input value and whereby each converter provides the digital outputs according to a second ratio of corresponding analog inputs above the preselected voltage input value.

5. An electrophotographic printing machine having an apparatus for sensing and subsampling luminance and chrominance of a sheet having multicolored indicia thereon, and means responsive to $L^*$ $a^*$ and $b^*$ values for reproducing a copy of the sheet being scanned in a fast scan direction and a slow scan direction, said apparatus comprising:

an array of n subsampling sensor sets spanning a fast scan direction width of n times m pixels, each of said sensor sets including, aligned in a slow scan direction column, a set of 2 pixel-sized green sensors aligned in a fast scan direction line for determining pixel-by-pixel green color and luminance, a red sensor extending 2 pixels wide in said fast scan direction and 2 pixels long in said slow scan direction for detecting red color, and a blue sensor extending 2 pixels wide in said fast scan direction and 2 pixels long in said slow scan direction for detecting blue color, and a main processor for determining a high resolution luminance according to a luminance output of said green sensors whereby said luminance outputs are transformed into Y tristimulus values and thereafter to high resolution L* values corresponding to the multicolored indicia on the sheet and a low resolution subsampled chrominance output according to said red sensor and said blue sensor color determinations whereby said luminance and chrominance outputs are transformed into X, Y and Z tristimulus values and thereafter to color corrected L* a* and b* values corresponding to the multicolored indicia on the sheet, wherein the main processor comprises a pretransformation chrominance channel summing processor for increasing a chrominance output precision, and a pretransformation luminance channel summing processor for increasing a luminance output precision and wherein said chrominance channel summing processor sums a quantity 2 of red color detections from said red sensors and 2 blue color detections from said blue sensors, and wherein said luminance channel summing processor sums 2 times 2 green sensor detections of luminance from said green sensors.

\* \* \* \* \*